Figure 1:
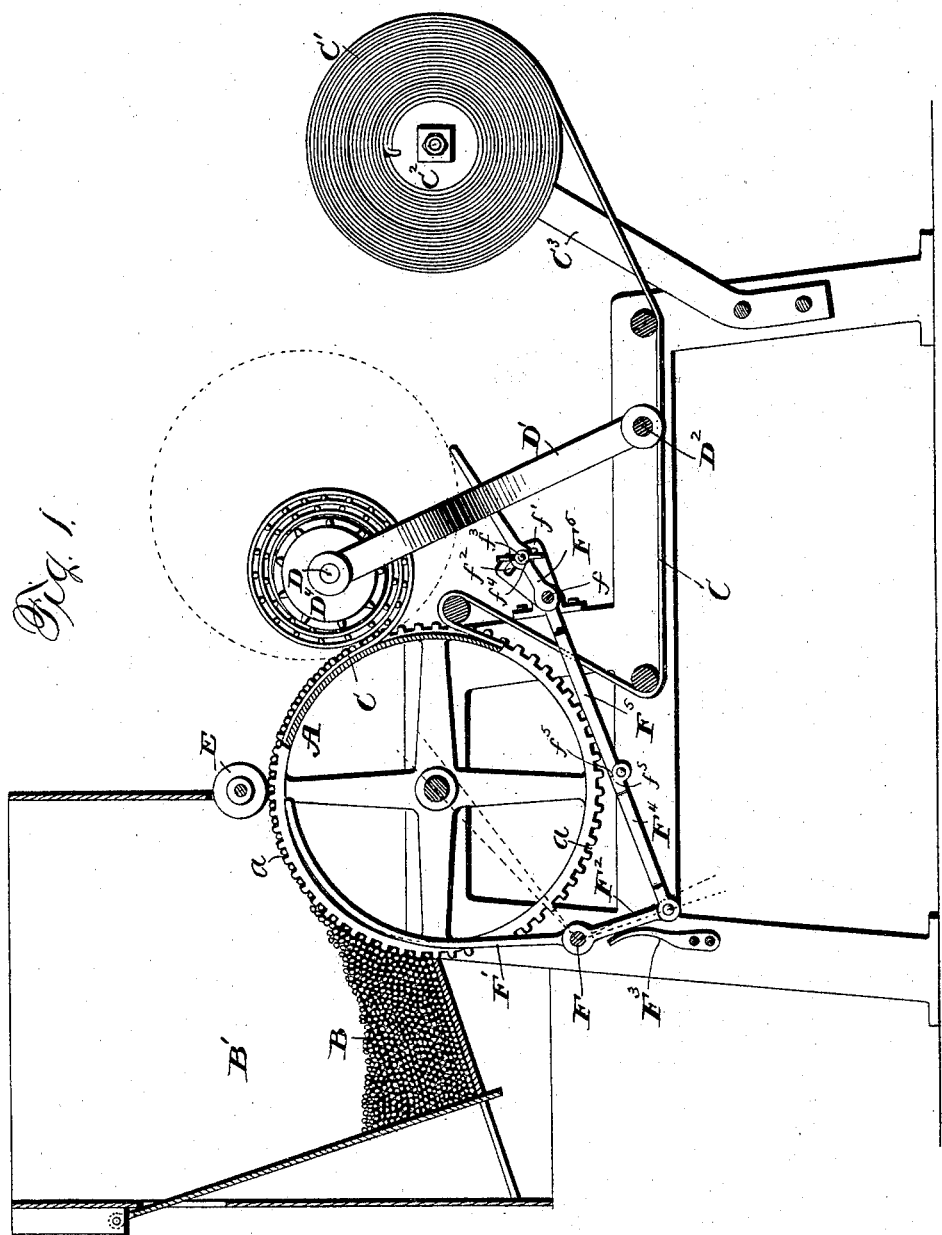

(No Model.)  3 Sheets—Sheet 1.
P. G. RUSSELL.
MATCH MAKING MACHINE.

No. 598,645. Patented Feb. 8, 1898.

Witnesses
Chas. J. Williamson
Henry C. Hazard

Inventor
Philip G. Russell, by
Prindle and Russell, his Attys.

(No Model.)  3 Sheets—Sheet 2.
P. G. RUSSELL.
MATCH MAKING MACHINE.
No. 598,645.  Patented Feb. 8, 1898.
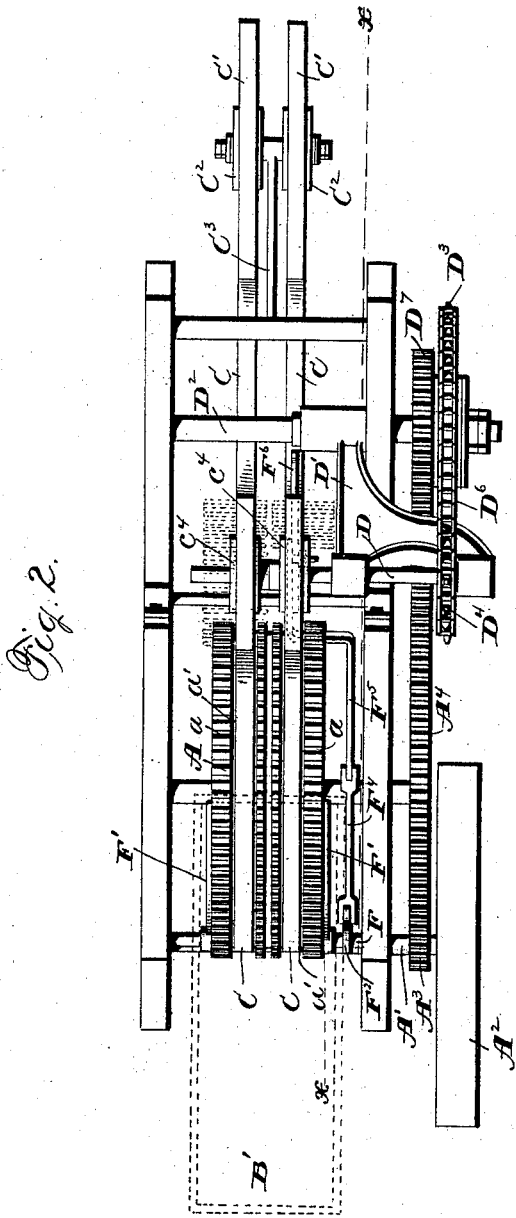
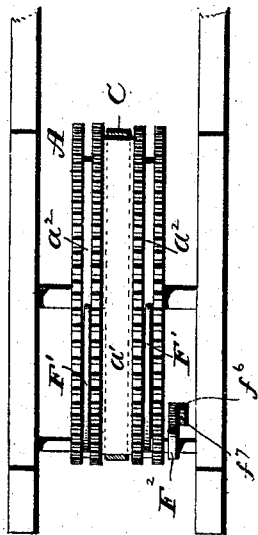
Witnesses
Chas. J. Williamson
Henry C. Hazard
Inventor
Philip G. Russell, by
Prindle and Russell, his Atty (No Model.)  P. G. RUSSELL.  3 Sheets—Sheet 3.
MATCH MAKING MACHINE.
No. 598,645.  Patented Feb. 8, 1898.
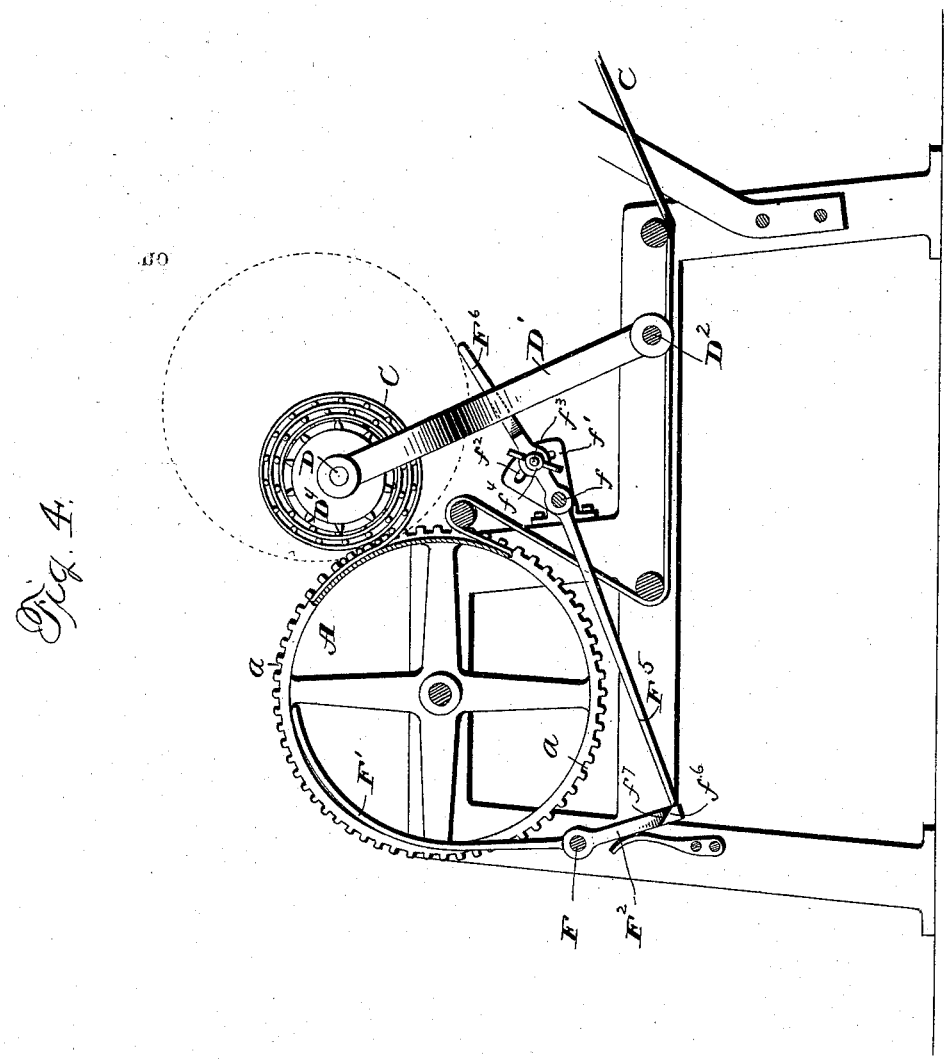

UNITED STATES PATENT OFFICE.

PHILIP G. RUSSELL, OF WASHINGTON, DISTRICT OF COLUMBIA, ASSIGNOR TO THE DIAMOND MATCH COMPANY, OF CHICAGO, ILLINOIS.

MATCH-MAKING MACHINE.

SPECIFICATION forming part of Letters Patent No. 598,645, dated February 8, 1898.

Application filed August 1, 1893. Serial No. 482,117. (No model.)

*To all whom it may concern:*

Be it known that I, PHILIP G. RUSSELL, of Washington, in the District of Columbia, have invented certain new and useful Improvements in Match-Making Machines; and I do hereby declare that the following is a full, clear, and exact description thereof, reference being had to the accompanying drawings, in which—

Figure 1 shows a view, partly in side elevation and partly in section on line $x\,x$ of Fig. 2, of a machine with my invention applied thereto; Fig. 2, a plan view of such machine with the hopper shown in dotted lines; Fig. 3, a detail plan view showing the feed-drum and the feed-stopping arms as arranged for a machine in which a single splint-receiving tape passes over the drum; and Fig. 4, a view, partly in section and partly in elevation, showing a modification of my automatic stop-feed device.

Letters of like name and kind refer to like parts in each of the figures.

The object of my invention has been to provide an improved automatic stop-feed device for use in connection with the splint-feeding mechanism of machines for bundling match-splints with one or more tapes by which the splints are held ready for dipping; and to this end my invention consists in the stop-feed device and in the combination of the same with other parts of the machine, as hereinafter specified.

The general construction of the machine as shown in Figs. 1, 2, and 4 is much the same as that shown and described in the United States patent to Donnelly, No. 450,405; but the splint cutting, guiding, and separating devices and the means for securing tension on the tapes of the patented machine are left off and a different form of stop-feed mechanism is used. As my invention has only to do with the last-named part, I need not herein describe at length the splint-feeding and tape-coiling devices, whose construction and operation can be understood from the drawings and description of the said United States patent or the previous British patent, No. 5,390, of 1887, granted to the same patentee, Donnelly.

The rotary feed-drum A, having in its periphery longitudinal grooves or pockets $a\,a$, adapted to receive single splints from the mass B in hopper B', through the lower and forward part of which the grooved periphery of the drum passes in contact with said mass of splints, is driven from the drive-shaft A', having the belt-pulley $A^2$, to which the driving power is to be applied by the pinion $A^3$, meshing with gear $A^4$ on the drum-shaft. As shown in Figs. 1 and 2, this drum is, as in the patented machine referred to, adapted for use with two parallel tapes C C, being provided with two circumferential grooves $a'\,a'$ to allow the passage of such tapes up over the drum below the bottoms of grooves or pockets $a\,a$. These tapes are supplied from the two rolls C' C', which are supported upon spools $C^2\,C^2$, journaled upon the arm or support $C^3$ on the frame of the machine. After leaving the feed-drum they run to the spools $C^4\,C^4$, to which their ends are attached. Such spools are mounted on the spindle D, so as to rotate therewith, but should be capable of ready removal from the same. The spindle is journaled in bearings on the swinging arm D', which is at its lower end pivoted upon the shaft $D^2$, so as to be capable of being swung to carry the spools $C^4\,C^4$ to and from the feed-drum A. Also journaled upon shaft $D^2$, which is supported in suitable bearings on the machine-frame, is a sprocket-wheel $D^3$, to be connected with the shaft by means of frictional connections, as and for the purpose set forth in the patents referred to. This sprocket-wheel is connected with a correspondingly smaller wheel $D^4$, fixed on the spindle D by the sprocket-chain $D^6$. The shaft $D^2$ is itself rotated by the gear $D^7$, connected with it and driven by suitable gearing from the gear-wheel $A^4$ on the shaft of the feed-drum. While these parts are thus shown and described, I desire it to be understood that the special construction set forth is not essential to my invention and can be departed from at will without affecting the latter.

At E is shown the roller, with yielding surface or body used in the patented machine to keep back in the hopper all splints not seated in the pockets of the feed-drum.

In connection with the splint-feeding devices, tapes, and tape-coiling mechanism of such machine there was an automatic stop-feed device to stop the feeding of the splints from the hopper by the feed-drum when the swinging arm D' had been moved a certain distance away from the feed-drum by the increase in the size of the coiled bundles of tapes and matches on the spools $C^4 C^4$. Part of such stop-feed mechanism, consisting of a rock-shaft F, journaled in suitable bearings on the frame and having attached to it arms F' F', which, normally standing below the periphery of the feed-drum, can be raised by a rocking of the shaft to engage the splints in the hopper and hold them above and out of the pockets or grooves of the drum, I make use of in the present device; but I employ different means of insuring the operation of the arms to stop the feed at a certain time with reference to the accumulation of tape or tapes and splints on the winding devices.

Instead of relying upon the motion of the swinging arm carrying the latter devices to cause the feed-stopping arms to be raised into operative position, I employ mechanism which is engaged and actuated by the roll or coil itself, so that when the latter reaches a certain predetermined size the feed from the drum will be quickly stopped.

As shown in Figs. 1 and 2, the arms F' F' are arranged to swing close to the opposite ends of the drum in position to engage the projecting ends of the splints when raised. Instead of this construction the drum might, as indicated in Fig. 3, be provided with circumferential grooves $a^3 a^2$, deeper than grooves $a$ $a$, to accommodate the arms F' F', which then would, when raised, engage the splints nearer their middle portions. Either of these constructions could be used as desired without any departure from my invention.

The rock-shaft F has fixed upon it a downwardly-extending arm $F^2$, against which a spring $F^3$ presses, so as to tend to turn the rock-shaft to raise the feed-stop spring-arms into position to keep the splints out of the pockets in the drum and so stop the feed. Obviously instead of using a spring for this purpose the mechanical equivalent thereof, a weight, might be used, attached to the arm $F^2$ so as to tend to move it as the spring does.

In the mechanism shown in Figs. 1 and 2 there is pivoted to the lower end of arm $F^2$ a link $F^4$, whose other end is pivotally connected with one end of a lever $F^5$, pivoted upon a shaft or stud $f$, attached to the frame. Beyond this pivot the lever has the segmental enlargement $f'$, provided with the curved slot $f^2$, concentric with the lever's pivot. Also pivoted on shaft or stud $f$ is the arm $F^6$, which projects outward below the support for the coiling devices on the swinging arm D' and is in position to be engaged by one of the coils on the spools $C^4 C^4$ on spindle D. Such arm $F^6$ is provided with a bolt $f^3$, which engages the slot $f^2$, and a set-nut $f^4$, by which the arm can be clamped to the segmental enlargement of lever $F^5$, so as to stand at any desired angle, with its outer end at any required height with reference to the spindle D. The raising or lowering of such arm $F^6$ will obviously put its outer end in position to be engaged and forced down by the increasing coil of tape and splints above it at an earlier or later point in the growth of such coil. By adjustment with relation to lever $F^5$ the arm can then be set to be engaged and moved by any desired size of coil. Its downward movement will cause the lever $F^5$ to be actuated to raise the pivotal connection between it and link $F^4$ until such connection is moved far enough above a line between the pivot of lever $F^5$ and the lower end of arm $F^2$ to enable the spring $F^3$ to still further flex the toggle formed by link $F^2$ and lever $F^5$ and cause the rock-shaft to turn and raise the stop-feed arms F' F' into feed-stopping position. The feed being thus stopped the coil or coils of tape and splints on the spools $C^4 C^4$ can be removed from spindle D and the stop-feed mechanism can be set again by simply raising the arm $F^6$ to depress the inner end of lever $F^5$ and bring it and link $F^4$ into line again, the downward movement of the pivotal connection between link and lever being limited by engaging shoulders $f^5 f^5$ on lever and link, respectively.

In Fig. 4 is shown another form of my device, in which instead of the toggle connection between lever $F^5$ and arm $F^2$, I have a lug $f^6$ on the latter in position to abut squarely against the end of the lever when the latter is down, and the coil-engaging arm $F^6$ is raised in position to be engaged and depressed by the coil when the latter reaches the predetermined size. On the upper side of this lug is an incline $f^7$, which the adjacent end of the lever $F^5$ will ride up over easily when such lever end has been passed above the abrupt abutting surface of the lug by depression of arm $F^6$. The spring $F^3$ can and will do its work to swing the arm $F^2$ inward to rock the shaft F and raise the arms F' F' into position to hold the splints up out of the pockets of the feed-drum. The device can be quickly set again in the same way as that shown in Figs. 1 and 2 by simple raising of arm $F^6$ to depress lever $F^5$. As the inner end of the lever descends it will in riding down over the inclined surface $f^7$ cam the arm $F^2$ back against the stress of the spring $F^3$ and lower the arms F' F' out of feed-stopping position and pass down into square contact with the abrupt face of the lug, as it was before the tripping operation described.

The operation of my feed-stopping mechanism, which will be fully understood from the drawings and the description hereinbefore given, is briefly as follows: The arm $F^6$ being set at any desired angle with reference to the lever $F^5$, so as to be in position to be engaged and depressed by a coil of tape and splints of any size determined upon, as the machine is operated in the manner fully described in the Donnelly patent referred to, the splints fed out by the drum will be taken by the tape or tapes and coiled up therewith on spools or spool-coiling device. When the coil which the arm F⁶ has been arranged to be engaged by becomes large enough in diameter to engage and depress such arm with its under side, the lever F⁵ will, by the downward movement of the arm, have its inner end raised to flex the toggle in one form of the device or to disengage the abrupt face of the lug on arm F², and the spring F³ will quickly cause the arms F' F' to rise.

From the foregoing description and the drawings it will be seen that my device is independent of and not actuated by the swinging arm supporting the coiling mechanism, and while being most simple and cheap in construction can be readily set to be thrown into action to stop the feed by a coil or bundle of any predetermined diameter.

Having thus described my invention, what I claim is—

1. In a machine for bundling match-splints, in combination with the source of supply of splints, a feed device, for taking the splints from the source of supply, one or more stop-arms to raise the splints away from the feed device, means tending normally to move such arm or arms to stop the feed, means for holding such arm or arms down, a movable piece connected with the arm-holding means, to trip the same, one or more tapes to which the splints are fed, and a rotary piece for coiling up the tape or tapes with the splints, situated so that the coil of tape and splints will engage the movable piece, to trip the feed-stop-arm-holding means, substantially as and for the purpose specified.

2. In a machine for bundling match-splints in combination with the source of supply of splints, a feed device with splint-receiving grooves or pockets to take the splints from the source of supply, one or more arms to raise the splints in such source away from the pockets of the feed device, means tending to hold such arm or arms normally raised, one or more tapes to which the splints are delivered from the feed device, mechanism for coiling up the tape or tapes with the splints, consisting of a rotary piece supported so as to be movable toward and from the feed device, and means for holding the feed-stopping arms out of operative position, adapted to be engaged and moved to allow such arms to rise by the engagement of the coil of tape and splints, substantially as and for the purpose described.

3. In a machine for bundling match-splints, in combination with the splint-holding hopper, and the feed device with pockets to receive the splints from the hopper, one or more tapes receiving the splints from the feed device, means for coiling up the tape or tapes with the splints, consisting of a rotary device supported so as to be movable toward and from the feed device, a rock-shaft, the feed-stop arms thereon, to raise the splints above the pockets of the feed device, means, as a spring, tending to raise such arms, and means for retaining them in lowered position adapted to be moved to allow the arms to rise by a bundle of a predetermined size engaging it, substantially as and for the purpose described.

4. In a machine for bundling match-splints, in combination with the splint-hopper, the end device with traveling surface provided with splint-receiving pockets, one or more tapes to receive the splints fed out from the hopper, coiling mechanism for the same, a rock-shaft carrying the feed-stop arms, means, as a spring, engaging an arm on the rock-shaft, and tending to hold the feed-stop arms raised in position to keep the splints out of the pockets of the feed device, a lever, connections between the same and the rock-shaft whereby as the lever is in one position, it will hold the rock-shaft turned with the feed-stop arms depressed, and an arm adjustably connected with said lever adapted to be engaged and moved by a coil of tape and splints on the coiling mechanism to release the rock-shaft, substantially as and for the purpose described.

5. In a machine for bundling match-splints in combination with the splint-holding hopper and a moving feed device with pockets to receive and carry the splints from the hopper, one or more coiling tapes, means for coiling up the tape or tapes with the splints, one or more feed-stop arms adapted, when moved in one direction to hold the splint in the hopper away from the pockets of the feed device, means tending to move the arm or arms in that direction, a toggle having one arm connected with the stop arm or arms, and its other arm connected with a piece adapted to be engaged and moved by the coil of tape and splints, so as to flex the toggle, substantially as and for the purpose specified.

In testimony that I claim the foregoing I have hereunto set my hand this 13th day of July, 1893.

PHILIP G. RUSSELL.

Witnesses:
GEO. G. COLEGATE,
WM. S. MCCARTHY.